US006041317A

United States Patent [19]

Brookner

[11] Patent Number: 6,041,317

[45] Date of Patent: Mar. 21, 2000

[54] POSTAL SECURITY DEVICE INCORPORATING PERIODIC AND AUTOMATIC SELF IMPLEMENTATION OF PUBLIC/PRIVATE KEY PAIR

[75] Inventor: George Brookner, Norwalk, Conn.

[73] Assignee: Ascom Hasler Mailing Systems, Inc., Shelton, Conn.

[21] Appl. No.: 08/974,028

[22] Filed: Nov. 19, 1997

Related U.S. Application Data

[60] Provisional application No. 60/031,305, Nov. 19, 1996.

[51] Int. Cl.[7] .......... G06F 17/00

[52] U.S. Cl. .......... 705/61; 705/401

[58] Field of Search .......... 705/1, 401, 410; 380/23, 24, 25

[56] References Cited

U.S. PATENT DOCUMENTS

| | | | |
|---|---|---|---|
| 4,097,923 | 6/1978 | Eckert, Jr. et al. | 705/403 |
| 4,376,299 | 3/1983 | Rivest . | |
| 4,405,829 | 9/1983 | Rivest et al. . | |
| 4,424,414 | 1/1984 | Hellman et al. . | |
| 4,811,234 | 3/1989 | Storace | 705/403 |
| 5,661,803 | 8/1997 | Cordery et al. | 705/403 |
| 5,796,841 | 8/1998 | Cordery et al. | 380/55 |
| 5,812,990 | 9/1998 | Ryan et al. | 705/60 |

*Primary Examiner*—Emanuel Todd Voeltz
*Assistant Examiner*—Thomas A. Dixon
*Attorney, Agent, or Firm*—Oppedahl & Larson LLP

[57] ABSTRACT

In accordance with the present invention, there is provided a greatly improved Postal Security Device (PSD) incorporating periodic and automatic self implementation of a public/private key pair. According to the invention, it is provided that the appropriate resources are contained in a PSD, thereby permitting the PSD generate a new set of public/private key pairs as required to change the secure cryptographic identity of the PSD. Such generation may occur in response to an arbitrary criterion, such as a request, a change in usage patterns, the amount spent, and/or the number of pieces processed. The number of key pair generations may be limited to a predetermined maximum. The appropriate authorities are then notified of the new PSD Public key. The new PSD key pair is used upon receipt of the appropriate certificate from the Certification Authority.

14 Claims, 2 Drawing Sheets

POSTAL SECURITY DEVICE INCORPORATING PERIODIC AND AUTOMATIC SELF IMPLEMENTATION OF PUBLIC/PRIVATE KEY PAIR

RELATED APPLICATIONS

This application claims priority from pending U.S. Provisional application Ser. No. 60/031,305 filed on Nov. 19, 1996, which is hereby incorporated by reference.

TECHNICAL FIELD

This invention is directed to a postal security device which incorporates periodic and automatic self implementation of public/private key pairs.

BACKGROUND OF THE INVENTION

In countries throughout the world, a postal customer may obtain postage from the appropriate Postal Authority in several ways, including the purchase of stamps and the use of a postage meter. When a postage meter is used, there is a security concern since the representations of postage available to be dispensed are stored within the meter, and without sufficient security, unscrupulous parties could add postage to a meter for which the Postal Authority has not been compensated.

These security concerns have always been present, even when a postage meter was essentially purely mechanical. With an essentially mechanical meter, security concerns were often addressed, in part, by the physical attributes of the meter. Not only do the attributes of the meter (case material, etc.) provide protection against the unauthorized use of the meter, the attributes also provide a means to detect whether an attempt has been made to make unauthorized use of the meter evidenced by visible deliberate damage to the meter's case.

Postage meters have evolved from essentially mechanical to primarily electronic. In many respects, a primarily electronic meter is preferred by a customer since it greatly facilitates recharging the meter without the inconvenience of having to physically take the meter to the Postal Authority. Such remote resetting, for example, is described in U.S. Pat. No. 4,376,299 for DATA CENTER FOR REMOTE POSTAGE METER RECHARGING SYSTEM HAVING A PHYSICALLY SECURE ENCRYPTING APPARATUS AND EMPLOYING ENCRYPTED SEED NUMBER SIGNALS, the disclosure of which is hereby incorporated by reference.

With evolution of the "meter," however, greater security against fraudulent attacks on the meter is needed. With the increase in the availability of elaborate technologies and sophisticated hacking capabilities, Postal Authorities around the world, including the United States Postal Service, are concerned with the ability to defraud the Postal Authorities by adding postage (or value) to the meter for which they have not been compensated, and also by falsifying postal indicium, particularly when such indicium is digitally printed.

One approach which as been taken to increase the security of evolved meters is to employ cryptographics to the resetting of the meter and the creation and application of the postal indicia. Such cryptographics may include the Digital Signature Algorithm (DSA), the Rivest Shamir Adelman Algorithm (RSA), and the Elliptic Curve Digital Signature Algorithm (ECDSA). Implementation of the RSA Algorithm is described in U.S. Pat. No. 4,405,829, the disclosure of which is hereby incorporated by reference.

There are, however, problems with the use of these cryptographics. For example, these cryptographics rely upon the use of keys, public and/or private. It is possible that the system within which the postage dispensing occurs is so regulated that the keys may be required, from time to time, to be changed based upon parameters as time, number of indicium produced, total monetary value dispensed, or the like. It is also possible for a key to become compromised, which thereby compromises security of the postage meter. In such instances where key changes are dictated or said compromise may have occurred, new keys need to be implemented, preferably as soon as possible. Doing so in a secure fashion, however, can be complicated and time consuming where the postage meter is in a customer's facility.

SUMMARY OF THE INVENTION

In accordance with the present invention, there is provided a greatly improved Postal Security Device (PSD) incorporating periodic and automatic self implementation of a public/private key pair. According to the invention, it is provided that the appropriate resources are contained in a PSD, thereby permitting the PSD generate a new set of public/private key pairs as required to change the secure cryptographic identity of the PSD. Such generation may occur in response to an arbitrary criterion, such as a request, a change in usage patterns, the amount spent, and/or the number of pieces processed. The number of key pair generations may be limited to a predetermined maximum. The appropriate authorities are then notified of the change such that vendor and appropriate regulatory agency databases remain in synchronism with the unique PSD effecting said key pair change.

DETAILED DESCRIPTION OF THE INVENTION

Figure 1:
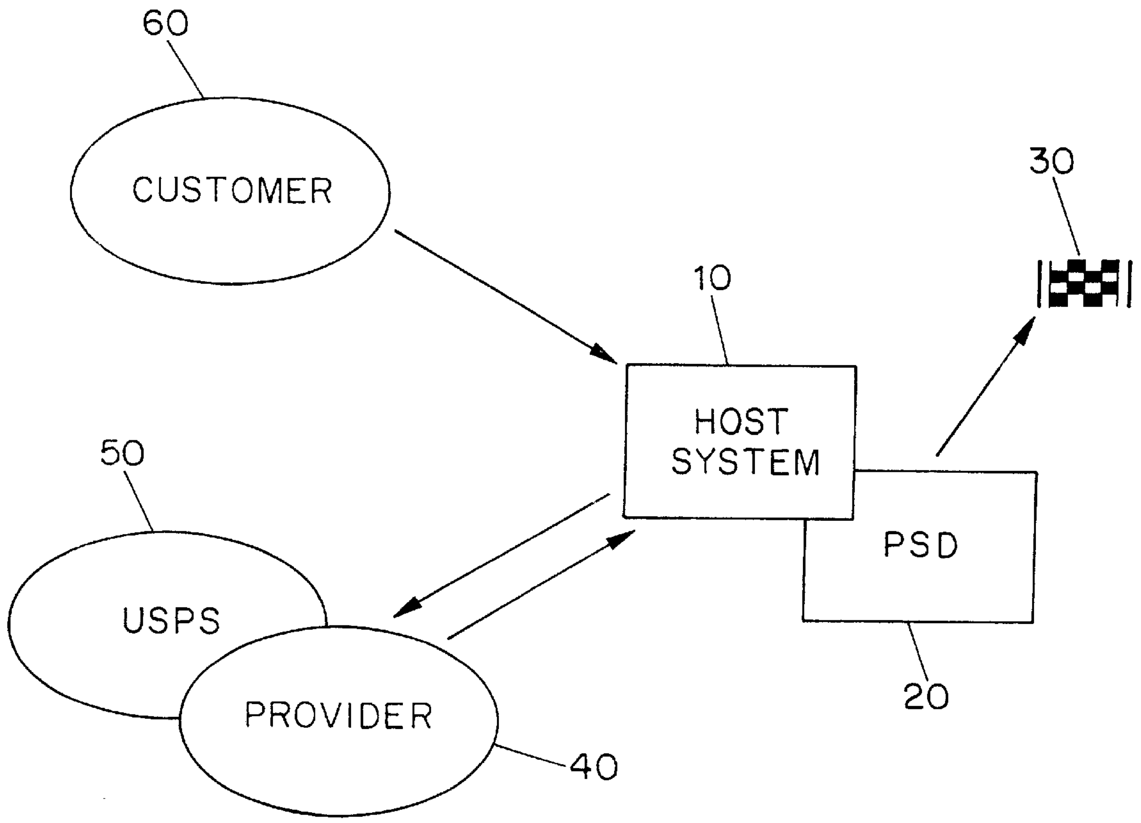
FIG. 1 is a block diagram showing a system in which the present invention is used.

FIG. 1 shows a system in which the present invention is used. This system contains a host system 10 which is operatively connected to PSD 20. The host system may be a stand alone device such as a conventional postage meter or may be another appropriate device, such as a personal computer. PSD 20 contains information representative of the traditional information maintained in postage meters, such ascending and descending registers and the like. This information is used by the PSD in the creation of postal indicium 30. The host system 10 is capable of communicating with provider (data center) 40, which in turn is capable of communicating with Postal Authority 50 or other Certification Authority. Preferably, host system 10 is also capable of communicating with a customer 60, such that customer 60 may provide user inputs, as requesting additional funds, which may be used by the host 10 in concert with the PSD 20 in the modification to PSD 20 contents supporting the creation of postal indicium 30.

Preferably PSD 30 is a cryptographically secure PSD, such as that described in a PCT Application which was filed on Nov. 7, 1997, entitled SYSTEM FOR PROTECTING CRYPTOGRAPHIC PROCESSING AND MEMORY RESOURCES FOR POSTAL FRANKING MACHINES application no. PCT/US97/15856, now PCT publication no.

WO 98/20461. The disclosure of said application is hereby incorporated by reference. Accordingly, all communication with the PSD outside of the cryptographic boundary established by the PSD is encrypted, including communications with provider 40 and Certification Authority 50.

It is preferred to use a Certification Authority to assist in the management of the cryptographic keys. The Certification Authority may be the Postal Authority or its designee. With public/private key cryptography, a concern is substitution of messages. How does the receiving party know that the message was generated by the party claiming to have done so? This is the role of the Certification Authority, with which public keys are registered.

The necessity for a Certifying Authority (CA) is to provide a mechanism that vouches for the identities of those to whom it issues certificates and their association with a given key. In order to prevent forged certificates, the CA's Public key is accepted as trustworthy by the users of the system (herein, the Postal Authority). The most secure use of authentication involves enclosing a certificate with a signed message. The receiver of the message would verify the certificate using the Certifying Authority's Public key and then confident with the Public key of the sender, verify the message's signature. Every signature points to a certificate that validates the Public key of the signer; this results in authentication and non-repudiation of the message. Authentication is realized by the fact that the receiving party can verify the digital signature on a transmission and be assured the transmission was originated by a trusted source and not other fraudulent parties. Non-repudiation is achieved by the fact that the originator of the message cannot deny the message contents as it is possible to generate the verifiable digital signature only with the originator's unique private key. Thus, a new certificate is required before a key pair may first be used.

Figure 2:
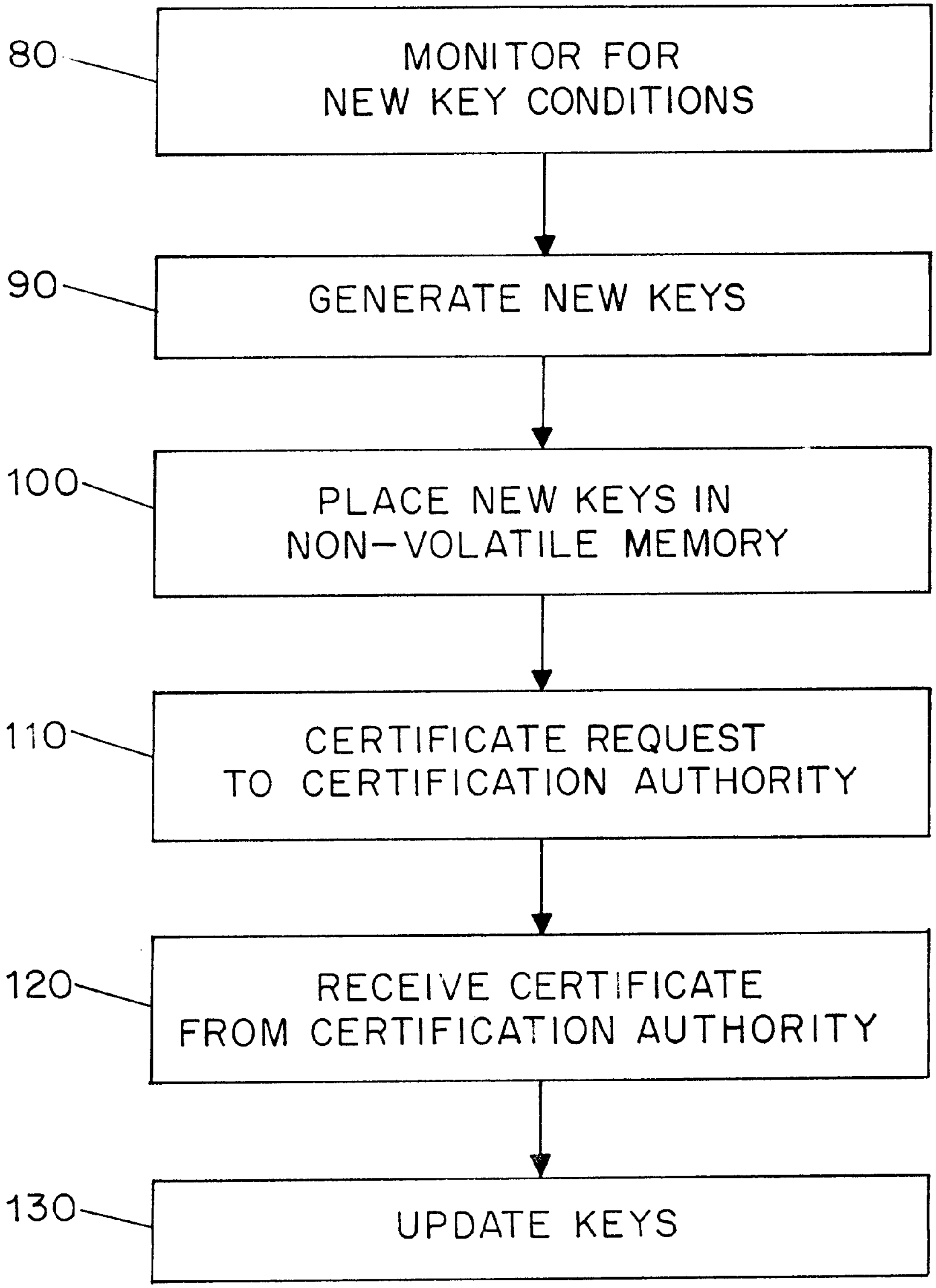
FIG. 2 is a block diagram showing the implementation of the present invention.

FIG. 2 is a block diagram showing an embodiment of the present invention implemented with a cryptographically secure PSD. The PSD monitors the previously selected criteria for new key conditions (80). These criteria can include an request by the user for new keys (on demand); a change in usage patterns of the PSD; an amount of postage dispensed by the PSD; or a number of mail pieces processed by the PSD; or other selected criteria.

Once the desirability of new keys is indicated, new public and private keys are generated by the PSD (90). These keys are not yet active, and until they are active, they remain in non-volatile memory (100). During the next communication with the PSD's provider (data center), the PSD includes the new public key in a certificate request to the provider (110). The certificate request is preferably tagged and signed by the PSD accordingly so it is identified and certified as belonging to that specific PSD. The provider signs the PSD's certificate and forwards it to a Certification Authority (CA). The CA receives the certificate request and generates a new PSD certificate and updates its database to reflect the new PSD Public key. The CA sends the new certificate containing the new public key to the Provider which sent the certificate request, which in turn, communicates the new certificate to the PSD (120) and updates its database to reflect the new PSD Public key. Such communication preferably occurs during the next communication between the provider and the PSD. Upon receipt of the new public key certificate, it is stored by the PSD in non-volatile memory and the PSD keys are updated with the CA's certificate content (130). The new Public key previously stored in the process of securing said related certificate from the Certification Authority is preferably deleted from memory.

This invention provides the PSD with a lifetime capability of creating sets of Public/Private key pairs, predetermined by the execution of an algorithm(s), when necessary, and not necessarily on a predetermined frequency. Keys are never stored in advance of need and only singularly created as the result of algorithm execution. The number of key pair generations may be limited to a predetermined maximum such that if they are changed too many times, misuse, fraud, tampering, etc. may be expected. The Public/Private key pair may be changed by the customer, Postal Authority, or Provider if a need arises. When the maximum number of changes allowed is reached or exceeded, the PSD preferably fail-safes itself and must be removed from service.

A typical way to change keys would be during an inspection process where some uncertainty of system compromise is envisioned. This would eliminate the need to change a PSD when said PSD customer is only an occasional user of the franking system. An occasional (low monetary expenditure) user could be one that would never require said PSD keys to be changed, while a higher volume user where risks of tampering may be considered to reap greater fraud, could be selectively "updated" as the need arises.

The communications required to notify the Postal Authority, Provider, Certification Authority, etc. of the key pair change would take place automatically at the next communication with said Postal Authority, Vendor, Provider Certification Authority, etc. The mechanism to do so would rest in the ability of the PSD to acknowledge to its communicating partner that its old key pair is changed and proceed to validate its old key pair operation with the communicating partner, thereupon the old key pair is destroyed (similar to the mechanism of re-keying a new computer password to assure it was entered correctly). In this way the communicating partner is told of the change, the change is validated and the old key pair is replaced with the new. If an attempt is made to change keys more than once before relating said update in the prescribed manner, said PSD may, can or would be inhibited from further operation.

While there have been described what are believed to be the preferred embodiments of the invention, those skilled in the art will recognize that other and further modifications may be made thereto without departing from the invention and it is intended to claim all such changes and modifications as fully within the scope of the invention.

What is claimed is:

1. A postal security device comprising:

(a) means for determining if a new key pair should be generated in response to a predetermined criterion;

(b) means for generating a new key pair;

(c) non-volatile memory for storing said new key pair;

(d) means for requesting a certificate of authentication for a portion of said new key pair from a Certification Authority;

(e) means for receiving a certificate of authentication for said portion of said new key pair from said Certification Authority;

(f) means for updating said postal security device such that said new key pair will be henceforth used by said postal security device.

2. The device of claim 1, wherein said predetermined criterion is a manual input.

3. The device of claim 1 wherein the key pair is a public/private key pair.

4. The device of claim 1, wherein said predetermined criterion is a preselected change in an ascending register contained within said postal security device.

5. The device of claim 1, wherein said predetermined criterion is a preselected change in a descending register contained within said postal security device.

6. The device of claim 1, wherein said predetermined criterion is a preselected change in the number of times said postal security device has operated.

7. The device of claim 1, wherein said predetermined criterion is a change in the usage pattern of said postal security device.

8. A method for use with a postal security device, comprising:

(a) determining if a new key pair should be generated in response to a predetermined criterion;

(b) generating a new key pair;

(c) storing said new key pair in non-volatile memory;

(d) requesting a certificate of authentication for a portion of said new key pair from a Certification Authority;

(e) receiving a certificate of authentication for said portion of said new key pair from said Certification Authority;

(f) updating said postal security device such that said new key pair will be henceforth used by said postal security device.

9. The method of claim 8, wherein said predetermined criterion is a manual input.

10. The method of claim 8, wherein said predetermined criterion is a preselected change in an ascending register contained within said postal security device.

11. The method of claim 8, wherein said predetermined criterion is a preselected change in a descending register contained within said postal security device.

12. The method of claim 8, wherein said predetermined criterion is a preselected change in the number of time said postal security device has operated.

13. The method of claim 8, wherein said predetermined criterion is a change in the usage pattern of said postal security device.

14. The method of claim 8 wherein the key pair is a public/private key pair.

* * * * *